(12) United States Patent
Komizo et al.

(10) Patent No.: US 8,522,924 B2
(45) Date of Patent: Sep. 3, 2013

(54) VEHICLE DRIVE APPARATUS

(75) Inventors: Kyosuke Komizo, Anjo (JP); Ko Tsunematsu, Anjo (JP); Kaoru Ono, Anjo (JP); Hirotoshi Okubo, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 710 days.

(21) Appl. No.: 12/656,273

(22) Filed: Jan. 22, 2010

(65) Prior Publication Data

US 2010/0242669 A1 Sep. 30, 2010

(30) Foreign Application Priority Data

Mar. 30, 2009 (JP) ................................. 2009-083506

(51) Int. Cl.
*F16H 57/04* (2010.01)
(52) U.S. Cl.
USPC ......................................................... 184/6.28
(58) Field of Classification Search
USPC ............................... 74/606 R; 184/6.28, 6.12
See application file for complete search history.

(56) References Cited

U.S. PATENT DOCUMENTS

| | | | | |
|---|---|---|---|---|
| 4,531,485 A | * | 7/1985 | Murther | 123/196 S |
| 4,758,130 A | * | 7/1988 | Waterworth | 417/236 |
| 5,199,528 A | * | 4/1993 | Rinaldo | 184/6.4 |
| 5,682,851 A | * | 11/1997 | Breen et al. | 123/196 A |
| 6,066,060 A | * | 5/2000 | Harper | 475/136 |
| 6,739,305 B2 | * | 5/2004 | Takahara et al. | 123/196 R |
| 6,941,922 B2 | * | 9/2005 | Williams et al. | 123/196 R |
| 7,240,657 B2 | * | 7/2007 | Watanabe | 123/196 R |
| 7,757,816 B2 | * | 7/2010 | Bar et al. | 184/6.28 |
| 7,762,277 B2 | * | 7/2010 | Yoshida et al. | 137/565.33 |
| 2006/0231057 A1 | * | 10/2006 | Futamura et al. | 123/196 R |
| 2007/0098567 A1 | * | 5/2007 | Johnson et al. | 417/199.1 |

FOREIGN PATENT DOCUMENTS

| | | |
|---|---|---|
| JP | A 61-282132 | 12/1986 |
| JP | A-2003-56681 | 2/2003 |
| JP | A 2003-106415 | 4/2003 |
| JP | A 2005-098338 | 4/2005 |

OTHER PUBLICATIONS

International Search Report mailed Mar. 30, 2010 for PCT/JP2010/051876.
Jun. 5, 2013 Office Action issued in Chinese Patent Application CN201080005311.7 (translation only).

* cited by examiner

*Primary Examiner* — William A Rivera
*Assistant Examiner* — Michael Riegelman
(74) *Attorney, Agent, or Firm* — Oliff & Berridge, PLC

(57) ABSTRACT

A vehicle drive apparatus includes a case main body portion accommodating the speed change mechanism; supply oil passages that are formed in the case main body portion and supply pressure oil to the speed change mechanism; a connection case portion connecting the engine and the case main body portion; a mechanical oil pump positioned in a connection region between the case main body portion and the connection case portion and having an inlet oil passage and an outlet oil passage which are connected to the supply oil passage; an electric oil pump capable of supplying pressure oil to the supply oil passages in parallel with the mechanical oil pump; and connection oil passages that are provided in the connection case portion and allow an inlet oil passage and an outlet oil passage of the electric oil pump to communicate with the supply oil passages.

17 Claims, 5 Drawing Sheets

VEHICLE DRIVE APPARATUS

INCORPORATION BY REFERENCE

The disclosure of Japanese Patent Application No. 2009-083506 filed on Mar. 30, 2009 including the specification, drawings and abstract is incorporated herein by reference in its entirety.

BACKGROUND

The present invention relates to a vehicle drive apparatus that has a hydraulically operated speed change mechanism, is connected to an engine for use, and further has an electric oil pump for generating an oil pressure to be supplied to the speed change mechanism.

In recent years, in order to reduce fuel consumption and exhaust gas emission, an increasing number of vehicles have an idling stop function for stopping an engine when the vehicle is stopped. Moreover, hybrid vehicles using an engine and a rotating electrical machine as a driving force source typically have a function to stop an engine when the vehicle is stopped or decelerated. However, in vehicles having a hydraulically operated speed change mechanism, a mechanical pump, which is driven by the engine, is also stopped when the engine is stopped. In this case, oil pressure supply to the speed change mechanism is stopped, and the speed change mechanism cannot be operated properly. Thus, in a known structure, an electric oil pump is provided as an auxiliary pump in addition to the mechanical pump, so that an oil pressure generated by the electric oil pump is supplied to the speed change mechanism while the engine is stopped.

Since it is usually difficult to dispose such an electric oil pump inside a vehicle drive apparatus, the electric oil pump is often attached in contact with the outside of a case of a vehicle drive apparatus. For example, in an apparatus of Japanese Patent Application Publication No. JP-A-2003-56681 (paragraphs [0019]-[0021], FIG. 1), an electric oil pump is attached to an outer side surface of a transmission, more specifically, to an outer side surface of a transmission case at a position corresponding to an engine driven mechanical oil pump disposed in the transmission case.

SUMMARY

Although transmissions having the same basic specification are mounted on various types of vehicles, transmissions requiring no electric oil pump, or transmissions requiring an electric oil pump are needed depending on the type of vehicles on which the transmission is to be mounted. One possible solution to meet such needs is to prepare two types of transmissions: the transmissions according to a specification requiring an electric oil pump; and the transmissions according to a specification requiring no electric oil pump. Oil passages for the electric oil pump are formed in one type of transmissions, while no oil passage for the electric oil pump is formed in the other type of transmissions. However, since two types of transmissions need to be manufactured, this solution is disadvantageous in terms of the manufacturing cost and the inventory cost. Another solution is to prepare only the transmissions according to the specification requiring an electric oil pump, and to close oil passages in the electric oil pump with sealing members to meet the needs for the transmissions according to the specification requiring no electric oil pump. However, this solution is also disadvantageous because additional cost is required for preparing the sealing members.

It is an object of the present invention to provide a vehicle drive apparatus structured so as to suppress factors for cost increase as those in conventional examples, even if the vehicle drive apparatus is adapted to both a specification requiring an electric oil pump and a specification requiring no electric oil pump.

In order to achieve the above object, a characteristic structure of a vehicle drive apparatus according to a first aspect of the present invention, which includes a hydraulically operated speed change mechanism and is connected to an engine for use, is to include: a case main body portion accommodating the speed change mechanism; supply oil passages that are formed in the case main body portion and supply pressure oil to the speed change mechanism; a connection case portion connecting the engine and the case main body portion; a mechanical oil pump positioned in a connection region between the case main body portion and the connection case portion and having an inlet oil passage and an outlet oil passage which are connected to the supply oil passages; an electric oil pump capable of supplying pressure oil to the supply oil passages in parallel with the mechanical oil pump; and connection oil passages that are provided in the connection case portion and allow an inlet oil passage and an outlet oil passage of the electric oil pump to communicate with the supply oil passages.

According to this characteristic structure, the following two connection case portions need only be prepared, and the case main body portion can be used in common: a connection case portion according to the specification requiring an electric oil pump in which the connection oil passages are formed so as to allow the inlet oil passage and the outlet oil passage of the electric oil pump to communicate with the supply oil passages; and a connection case portion according to the specification requiring no electric oil pump in which no connection oil passage is formed. That is, no oil passage for the electric oil pump need be formed in the case main body portion, and the case main body portion can be used in common, which is advantageous in terms of the manufacturing cost and the inventory cost. The connection case portions are structured to be connected to the engine. For the structural reason that the connection case portion is connected to the engine, the shape of the connection case portions often needs to be changed according to a slight change in the engine specification. Thus, it is not so disadvantageous to divide the connection case portions into two types: the connection case portions according to the specification requiring an electric oil pump; and the connection case portions according to the specification requiring no electric oil pump.

The connection oil passages may communicate with the supply oil passages via the inlet oil passage and the outlet oil passage of the mechanical oil pump. The connection oil passages of the electric oil pump can communicate with the supply oil passages by using the inlet oil passage and the outlet oil passage of the mechanical oil pump, which are formed in any case. This increases the degree of freedom in design of the connection oil passages of the electric oil pump, and is also advantageous in terms of the manufacturing cost.

On the other hand, the connection oil passages may be directly connected to the supply oil passages. For example, the connection oil passages of the electric oil pump, and a part of the passage wall of each supply oil passage or a branch passage of each supply oil passage may be open at the contact surface between the connection case portion and the case main body portion, so that their respective openings communicate with each other. This oil passage structure enables the oil passages to be formed more efficiently.

The electric oil pump may be attached to the connection case portion. The connection oil passages for connecting the inlet oil passage and the outlet oil passage of the electric oil pump to the supply oil passages are formed in the connection case portion. Thus, directly attaching the electric oil pump to the connection case portion simplifies a sealing connection between the inlet oil passage and the outlet oil passage of the electric oil pump, and the connection oil passages.

The engine, the connection case portion, and the case main body portion may be axially connected together, and the connection case portion may have a partition wall, which radially extends so as to overlap the mechanical oil pump, in a region on the case main body portion side of the connection case portion, respective connection ports of the connection oil passages may be formed in an end face of the partition wall, which is located on the case main body portion side of the connection case portion and faces toward an axial direction, and the connection ports may be connected through sealing to opposing connection ports, which are provided at respective ends of the inlet oil passage and the outlet oil passage of the mechanical oil pump, or to opposing connection ports provided in the supply oil passages.

This structure simplifies connection between the inlet oil passage and the outlet oil passage of the mechanical oil pump, and the connection oil passages formed in the connection case portion, whereby the cost can be reduced. In this case, the inlet oil passage and the outlet oil passage of the mechanical oil pump may be provided in a pump case that forms the mechanical oil pump. This structure provides an advantage in that a sealing connection between the inlet oil passage and the outlet oil passage of the mechanical pump, and the connection oil passages can be implemented by merely attaching the pump case to the connection case portion.

The vehicle drive apparatus may also be structured so that at least one of a torque converter, a damper, a clutch, a flywheel, and a rotating electrical machine is accommodated in the connection case portion. In this case, functions and roles of the connection case portion can be optimally selected.

DETAILED DESCRIPTION OF EMBODIMENTS

Figure 1:
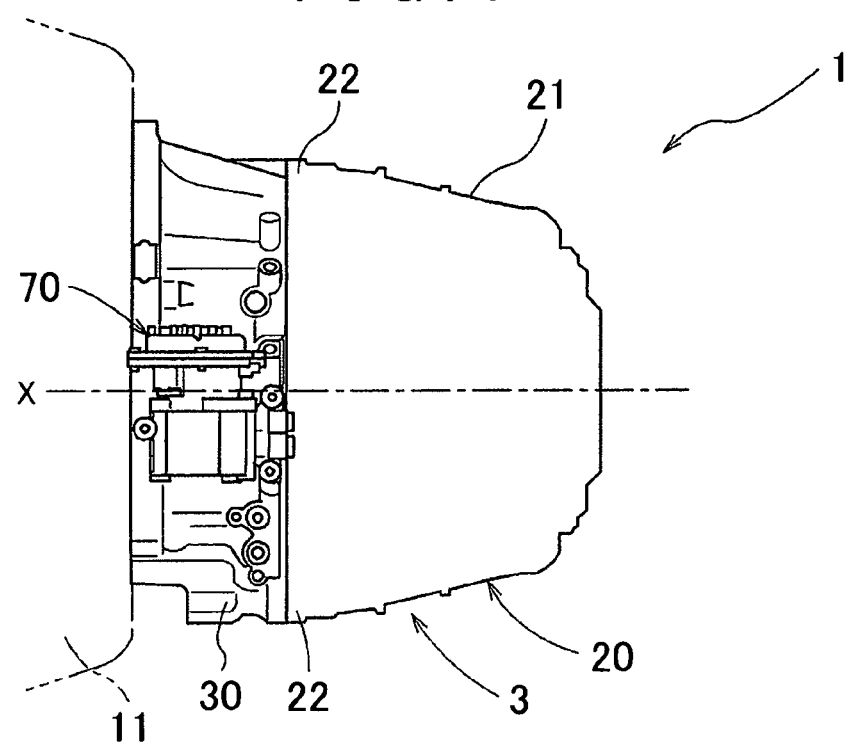
FIG. 1 is a partial cross section showing a main part of a vehicle drive apparatus according to an embodiment of the present invention.
Figure 2:
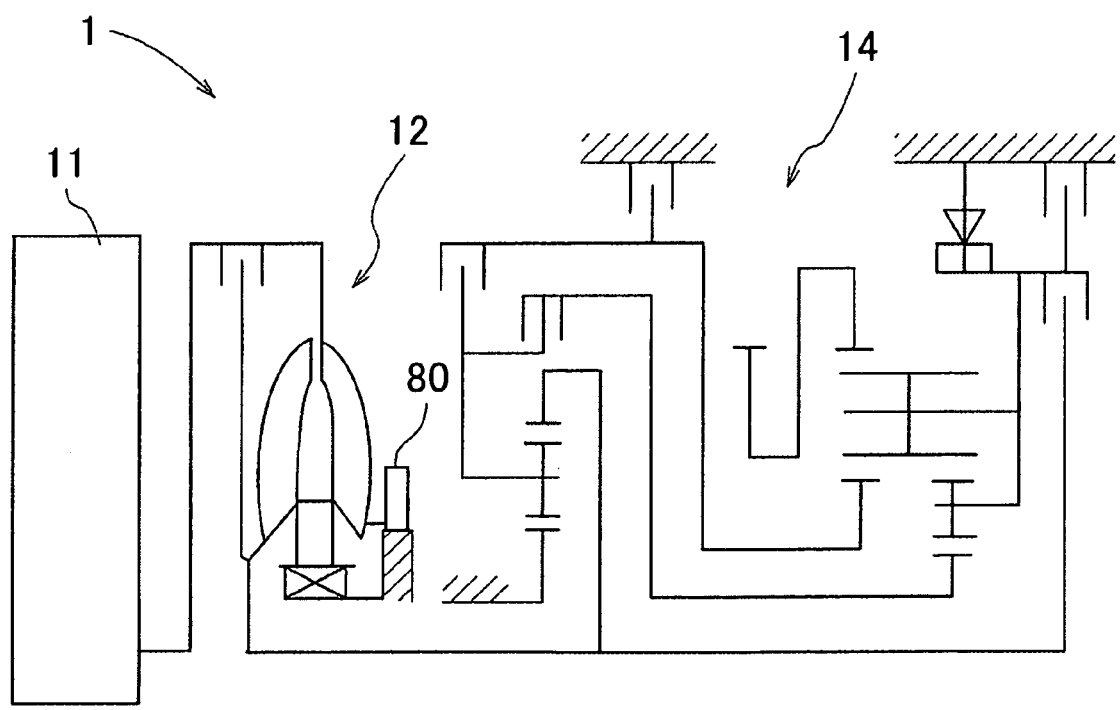
FIG. 2 is a skeleton diagram of the vehicle drive apparatus.

An embodiment of the present invention will be described with reference to the accompanying drawings. FIG. 1 is a partial cross section showing a main part of a vehicle drive apparatus 1. FIG. 2 is a skeleton diagram of the vehicle drive apparatus 1. FIG. 1 shows a case 3 accommodating a torque converter, a speed change mechanism, and the like, and the outer shape of an engine 11 connected to the case 3 is shown by two-dotted chain line. The case 3 has a case main body portion 20 and a connection case portion 30. A torque converter is accommodated in the connection case portion 30, and an electric oil pump (hereinafter simply referred to as the "electric pump") 70 is attached to the outside of the connection case portion 30. A hydraulically operated speed change mechanism 14 is accommodated inside the case main body portion 20, and only an outer contour line of the case main body portion 20 is shown in FIG. 1.

In this vehicle drive apparatus 1, the engine 11 is fixedly connected to the front side end of the connection case portion 30 of the case 3, and the case main body portion 20 is fixedly connected to the rear side end of the connection case portion 30. The connection case portion 30 and the case main body portion 20 are axially connected to each other.

Although detailed description of the structure of the speed change mechanism 14 is omitted, as can be understood from FIG. 2, the speed change mechanism 14 is mainly formed by a planetary speed change mechanism, which is formed by a planetary gear unit and engagement elements such as clutches and brakes for engaging rotary elements of the planetary gear unit. It should be understood that other speed change mechanisms may be used. Other speed change mechanisms, for example, speed change mechanisms including a constant mesh type gear pair and a synchronization mechanism, various continuously variable speed change mechanisms such as a belt type and a toroidal type, and electric continuously variable speed change mechanisms formed by combining a rotating electrical machine and a differential gear unit, may be used, or combinations of these speed change mechanisms may be used. In any case, the speed change mechanism 14 has hydraulically operated hydraulic elements, such as a hydraulic cylinder for operating parts such as engagement elements like a clutch and a brake, a synchronization mechanism, and a movable sheave of a pulley. Although not shown in the drawing, an oil pressure control apparatus for controlling an oil pressure to be supplied to the speed change mechanism 14 is disposed under the speed change mechanism 14 inside the connection case portion 30. A pump impeller, which serves as an input member of a torque converter 12, is connected so as to rotate integrally with an engine output shaft, such as a crankshaft of the engine 11, and a mechanical oil pump 80 is disposed so as to be driven by the pump impeller or the engine output shaft. Note that the axial center of the engine output shaft is shown by X in FIG. 1. Note that, in the description of the present embodiment, the side connected to the engine 11 (the left side in FIG. 1) is referred to as "front," and the side opposite to the side connected to the engine 11 (the right side in FIG. 1) is referred to as "rear." The side on which an oil pan (not shown) is provided in the case 3 (the lower side in FIG. 1) is referred to as "lower," and the side opposite thereto (the upper side in FIG. 1) is referred to as "upper." The right side when viewed toward the front is referred to as "right," and the left side is referred to as "left." The axial direction is the direction along the axial center X of the engine output shaft, and the radial direction substantially means the direction perpendicular to the axial center X of the engine output shaft. Note that these directions are determined independently of the direction of a vehicle on which the vehicle drive apparatus 1 is mounted. For example, the longitudinal direction of the case main body 20 may be the same as the longitudinal direction of the vehicle, or may be the same as the lateral direction of the vehicle.

Although merely schematically shown in FIG. 1, the case main body portion 20 has a substantially cylindrical peripheral wall 21, and a rear end wall, not shown, which covers the rear of the internal space in which the above speed change mechanism 14 is accommodated. Oil passages for supplying pressure oil to the oil pressure control apparatus are formed in a wall body portion of the peripheral wall 21. A connection flange 22 for connection to the connection case portion 30 is provided at the front end of the peripheral wall 21. Fastening holes for fastening bolts as fastening members are provided in the connection flange 22.

Figure 3:
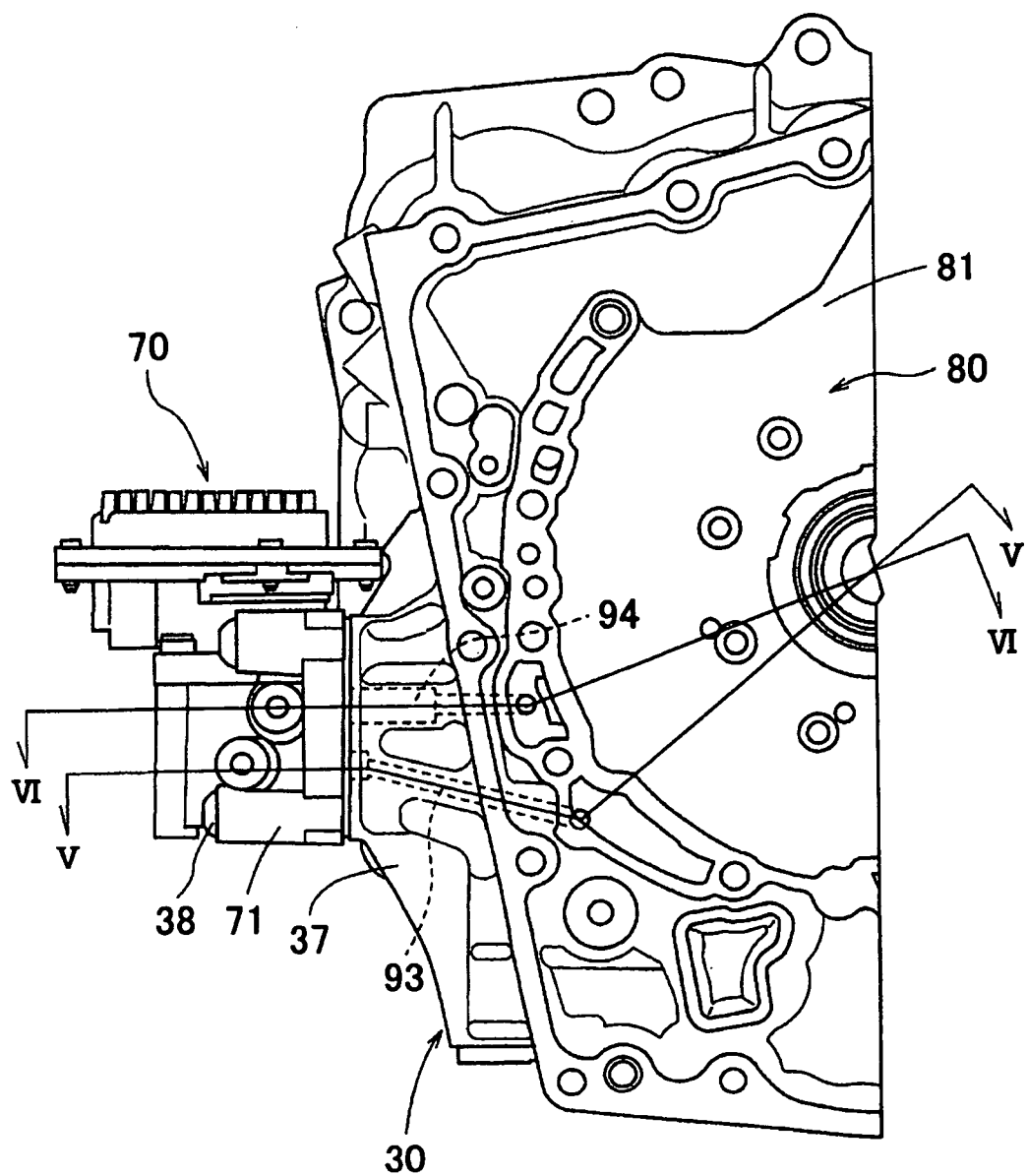
FIG. 3 is a front view of the left half of a connection case portion having a pump case attached thereto.
Figure 4:
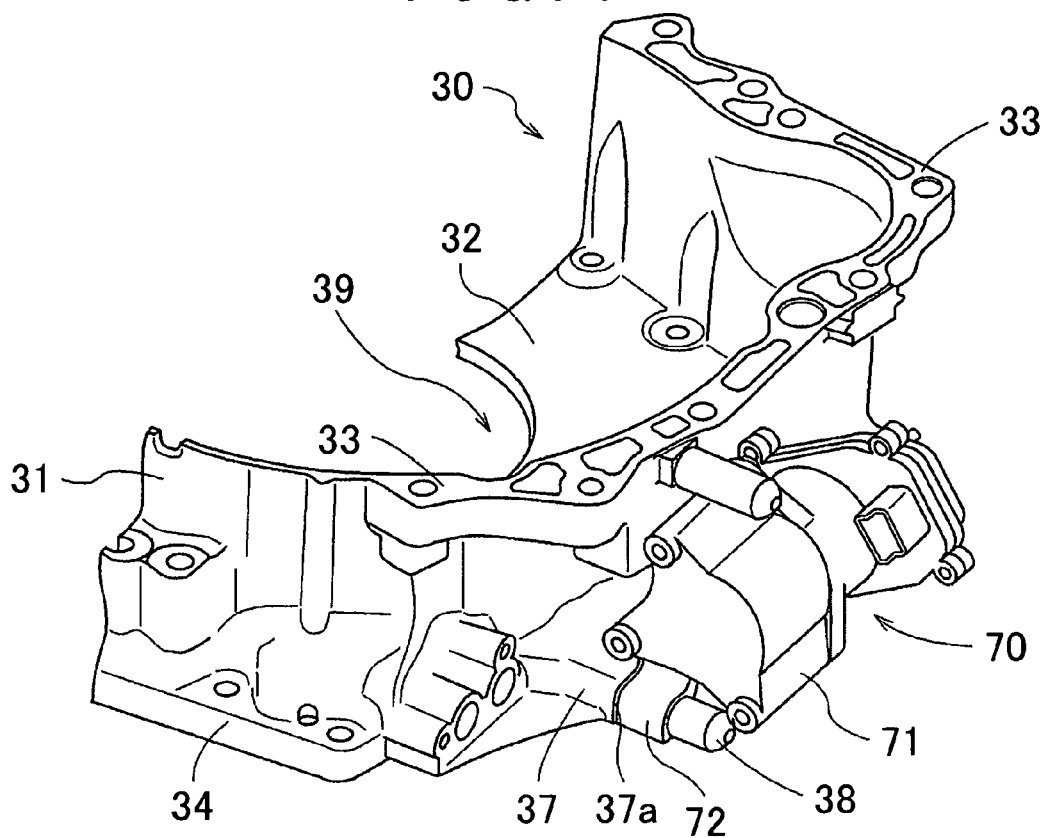
FIG. 4 is a perspective view of the left half of the connection case portion.
Figure 5:
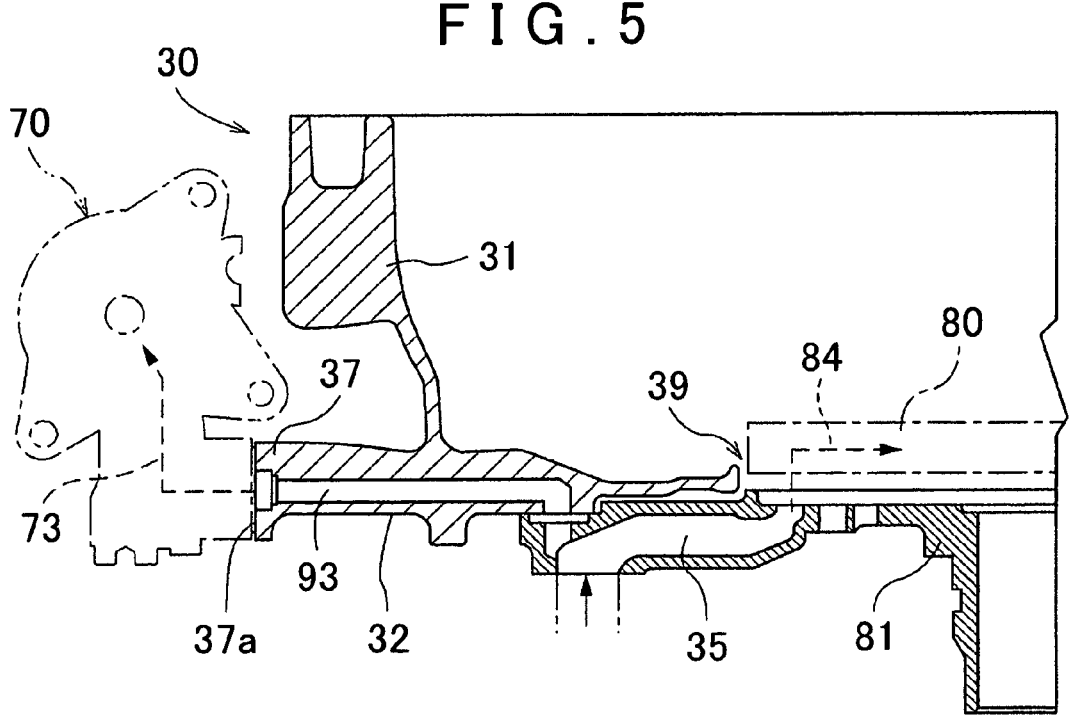
FIG. 5 is a cross section taken along line V-V in FIG. 3.
Figure 6:
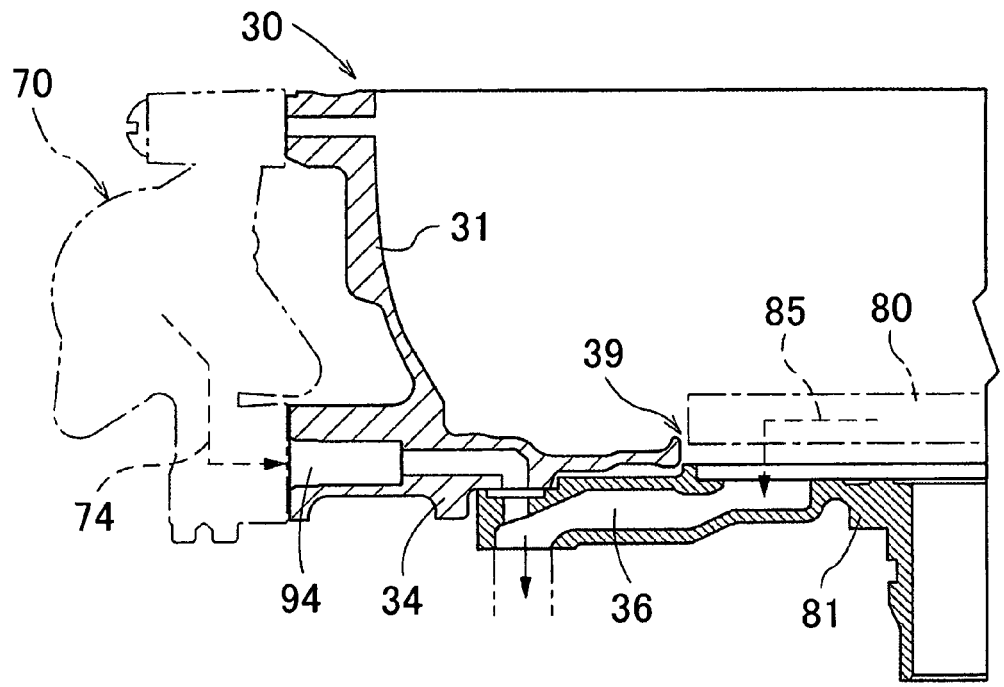
FIG. 6 is a cross section taken along line VI-VI in FIG. 3.

Next, the structure of the connection case portion 30 will be described with reference to FIGS. 3, 4, 5, and 6. FIG. 3 is a front view of the left half of the connection case portion 30 when viewed from the case main body portion 20 side, showing the state where a pump case 81 of the mechanical oil pump 80 (hereinafter simply referred to as the "mechanical pump"), which will be described below, has been attached to the connection case portion 30. FIG. 4 is a perspective view of the left half of the connection case portion 30. FIG. 5 is a cross section taken along line V-V in FIG. 3, and FIG. 6 is a cross section taken along line VI-VI in FIG. 3. As described above, the connection case portion 30 is connected to the front side (the engine 11 side) of the case main body portion 20, and is formed as a joint member connecting the engine 11 and the case main body portion 20. In the present embodiment, the connection case portion 30 forms an internal space for accommodating mainly the torque converter 12. Thus, the connection case portion 30 has an axially extending peripheral wall 31, and a radially extending partition wall 32 that defines the internal space of the case main body portion 20. The partition wall 32 is a wall that covers the front of the speed change mechanism 14. An opening 39 is provided in the radial center of the partition wall 32 so as to axially extend therethrough. An intermediate shaft, not shown, extends through the opening 39, and is rotatably supported therein. The intermediate shaft serves both as an output shaft of the torque converter 12, and an input shaft of the speed change mechanism 14. The peripheral wall 31 of the connection case portion 30 has a cylindrical shape. An engine-side flange 33 for connection of the connection case portion 30 to the engine 11 is provided at the front end of the connection case portion 30. Insertion holes for inserting bolts therethrough are provided in the engine-side flange 33. The connection case portion 30 is fixedly fastened to the engine 11 by the bolts inserted through the insertion holes. A main body-side flange 34 is provided on the outer periphery of the partition wall 32 of the connection case portion 30, and insertion holes for inserting bolts therethrough are also provided in the main body-side flange 34. As shown in FIG. 1, the case main body portion 20 and the connection case portion 30 are fixedly fastened together by inserting the bolts through the insertion holes, and fastening the bolts in the fastening holes of the connection flange 22.

The mechanical pump 80, a part of which is shown only by chain line in FIGS. 5 and 6, is positioned in a connection region between the case main body portion 20 and the connection case member 30 in the case 3 (a front end region of the case main body portion 20). Although the pump case 81 of the mechanical pump 80 is attached to the partition wall 32 of the connection case portion 30, only a part of the pump case 81 is shown in FIGS. 5 and 6. As well known in the art, in the structure of such a mechanical pump 80, the pump case 81 and the partition wall 32 cooperatively form a pump chamber between the pump case 81 and the partition wall 32, and a rotor is rotatably accommodated in the pump chamber. Since the rotor is connected to the intermediate shaft, the mechanical pump 80 is driven by a driving force of the engine 11 via the torque converter 12. In general, the mechanical pump 80 is an internal gear pump, where both an inner rotor and an outer rotor of the rotor are accommodated in the pump chamber, and the inner rotor is fixed to the intermediate shaft. It is to be understood that the mechanical pump 80 may be an external gear pump or a vane pump. Although merely schematically shown by chain line in FIGS. 5 and 6, an inlet oil passage 84 and an outlet oil passage 85 are formed in the mechanical pump 80 as in-case oil passages. Thus, the mechanical pump 80 is connected so as to communicate with the oil pressure control apparatus and the like via the inlet oil passage 84 and the outlet oil passage 85 in the pump, a main inlet oil passage 35 and a main outlet oil passage 36, which are provided in the connection case portion 30 (more precisely, in the pump case 81 attached to the connection case portion 30), and supply oil passages, not shown, which are formed in the case main body portion 20. Thus, pressure oil discharged from the mechanical pump 80 is supplied to each hydraulic element of the vehicle drive apparatus 1.

In addition to the above mechanical pump 80, this vehicle drive apparatus 1 includes the electric pump 70 for generating an oil pressure to be supplied to each part of the vehicle drive apparatus 1, such as the speed change mechanism 14, via the oil pressure control apparatus. That is, like the mechanical pump 80, the electric pump 70 pumps up oil accumulated in the oil pan, and supplies pressure oil to each part of the vehicle drive apparatus 1. The electric pump 70 includes a pump main body for generating an oil pressure, and an electric motor serving as a driving force source of the pump main body. This electric motor is provided separately from a driving force source of the vehicle, such as the engine, and operates by using the electric power such as a battery, not shown. The pump main body of the electric pump 70 is an internal gear pump in this example, where both an inner rotor and an outer rotor of a rotor are accommodated in a pump chamber, and the inner rotor is rotation-driven by the electric motor. Note that the structure of the electric pump 70 is not limited to this, and an external gear pump, a vane pump, and the like are also preferable types of the pump. The electric motor and the pump main body of such an electric pump 70 are accommodated in an electric pump case 71. As can be seen from FIG. 3, a protruding pump attachment flange 37 is formed in the connection case portion 30 at a position slightly lower than the center of the left side surface of the connection case portion 30. An attached seat 37a, which is in close contact with an attaching seat 72 of the electric pump case 71, is formed in the pump attachment flange 37. An inlet oil passage 73 and an outlet oil passage 74 are formed in the electric pump case 71 as oil passages in the pump. The inlet oil passage 73 and the outlet oil passage 74 are open at the seat surface of the attaching seat 72 of the electric pump case 71. An inlet connection oil passage 93 and an outlet connection oil passage 94, which respectively communicate with the main inlet oil passage 35 and the main outlet oil passage 36, extend to the attached seat 37a of the pump attachment flange 37, and are open at the seat surface of the attached seat 37a. The inlet connection oil passage 93 and the outlet connection oil passage 94 are connected through sealing to the openings of the inlet oil passage 73 and the outlet oil passage 74, respectively, when the electric pump case 71 is attached to the connection case portion 30.

Figure 7:
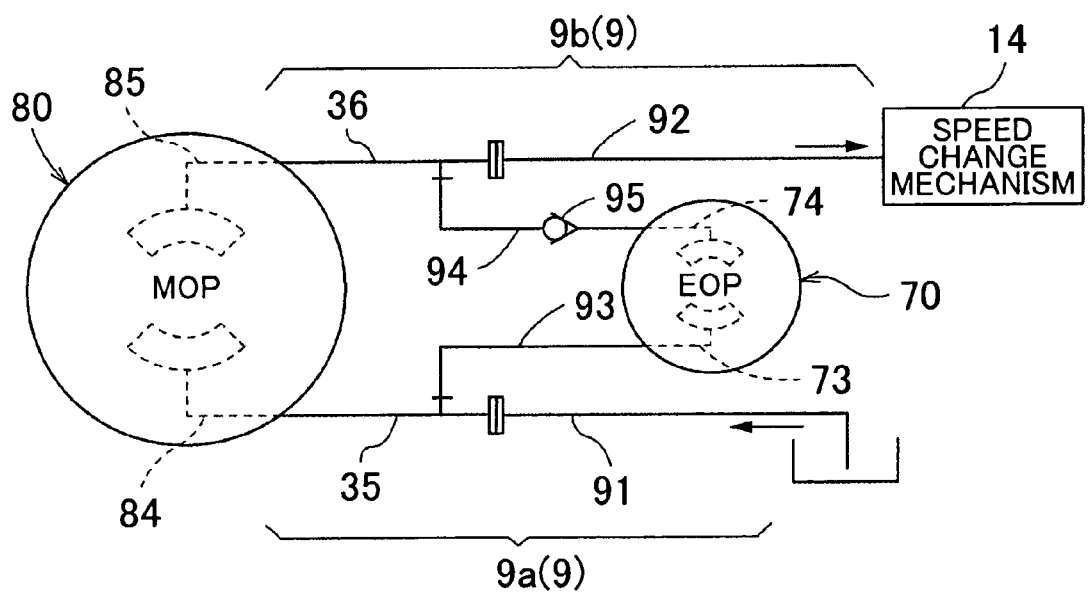
FIG. 7 is a hydraulic circuit diagram showing the relation among a mechanical pump, an electric oil pump, and oil passages.

Next, the structure of supply oil passages for supplying pressure oil in the mechanical pump 80 and the electric pump 70 will be described with reference to the hydraulic circuit diagram of FIG. 7. A supply oil passage 9 of the mechanical pump 80 is formed by an inlet-side first supply oil passage 9a and an outlet-side second supply oil passage 9b. The first supply oil passage 9a includes a first main body-side supply oil passage 91 formed in the case main body portion 20, and the main inlet oil passage 35, which is a connection case-side supply oil passage formed in the connection case portion 30 (more precisely, in the pump case 81 attached to the connection case portion 30). The second supply oil passage 9b includes a second main body-side supply oil passage 92 formed in the case main body portion 20, and the main outlet oil passage 36, which is a connection case-side supply oil passage formed in the connection case portion 30 (more precisely, in the pump case 81 attached to the connection case portion 30).

In the present embodiment, the electric pump 70 communicates with the first supply oil passage 9a via the inlet connection oil passage 93 connected through sealing to the main inlet oil passage 35 of the mechanical pump 80. In other words, the electric pump 70 communicates with the first main body-side supply oil passage 91 via the main inlet oil passage 35 and the inlet connection oil passage 93. Moreover, the electric pump 70 communicates with the second supply oil passage 9b via the outlet connection oil passage 94 connected through sealing to the main outlet oil passage 36 of the mechanical pump 80. In other words, the electric pump 70 communicates with the second main body-side supply oil passage 92 via the main outlet oil passage 36 and the outlet connection oil passage 94. That is, the mechanical pump 80 and the electric pump 70 are connected in parallel to the supply oil passage 9 for supplying pressure oil to the speed change mechanism 14, whereby the pressure oil can be supplied from one of the pumps to the speed change mechanism 14.

The outlet connection oil passage 94 of the electric pump 70 is provided with a check valve 95 for preventing reverse flow of the pressure oil to the electric pump 70 while an oil pressure is generated by the mechanical pump 80, and for protecting the electric pump 70 from an excess pressure from the main outlet oil passage 36 and the second main body-side supply oil passage 92.

As can be understood from FIGS. 5 and 6, the mechanical pump 80 is substantially positioned so as to extend radially along the internal space of the opening 39 provided in the partition wall 32 of the connection case portion 30. In other words, the partition wall 32, which extends radially inward from the peripheral wall 31 of the connection case portion 30, extends radially so as to overlap the mechanical pump 80 from a region of the connection case portion 30 on the case main body portion 20 side. Respective connection ports of the inlet connection oil passage 93 and the outlet connection oil passage 94 are open at the end face of the partition wall 32, which axially faces the case main body portion 20. These connection ports are respectively connected through sealing to opposing connection ports, which are respectively provided at the respective ends of the main inlet oil passage 35 and the main outlet oil passage 36 of the mechanical pump 80 formed in the pump case 81.

As can be seen from FIGS. 1, 3, and 4, the electric pump 70 is attached to the pump attachment flange 37 by fastening a plurality of fastening bolts 38 as fastening members. In the present example, the electric pump 70 is attached to the pump attachment flange 37 by three fastening bolts 38. Thus, a plurality of (three in this example) insertion holes for inserting the fastening bolts 38 therethrough, respectively, are provided in the electric pump case 71. A plurality of (three in this example) fastening holes for fastening the fastening bolts 38 therein, respectively, are provided in the pump attachment flange 37. The insertion holes and the fastening holes are provided at corresponding positions. Thus, the electric pump 70 is fixedly fastened to the pump attachment flange 37 by inserting the fastening bolts 38 through the insertion holes of the electric pump case 71 and fastening the fastening bolts 38 in the fastening holes.

By attaching the electric pump 70 to the pump attachment flange 37 in this manner, as shown in FIG. 1, the electric pump 70 is positioned so as to axially overlap the peripheral wall 31 of the connection case portion 30 while being radially adjacent to the peripheral wall 31. Thus, the electric pump 70 neither axially protrudes from the connection case portion 30, nor radially protrudes from the lower surface of the connection case portion 30. Thus, the ground clearance of the vehicle can be easily ensured.

Figure 8:
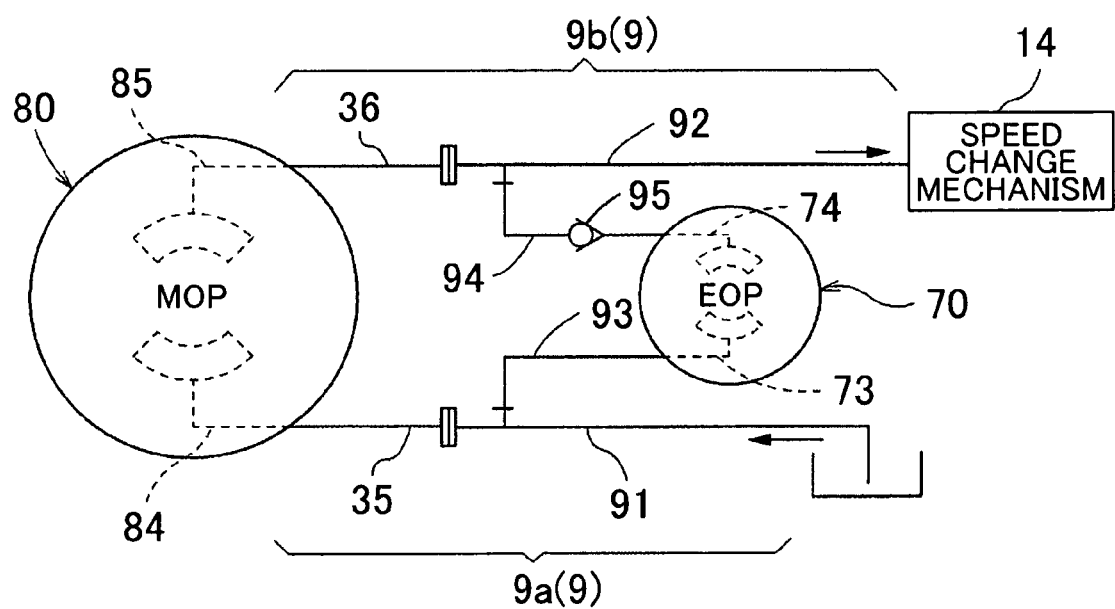
FIG. 8 is a hydraulic circuit diagram showing the relation among a mechanical pump, an electric oil pump, and oil passages in another embodiment.

Other Embodiments (1) In the above embodiment, the inlet connection oil passage 93 of the electric pump 70 is connected to the main inlet oil passage 35 formed in the connection case portion 30 (more precisely, in the pump case 81 attached to the connection case portion 30), and the outlet connection oil passage 94 of the electric pump 70 is connected to the main outlet oil passage 36 formed in the connection case portion 30 (more precisely, in the pump case 81 attached to the connection case portion 30). However, the connection structure between the inlet connection oil passage 93 and the outlet connection oil passage 94 of the electric pump 70, and the supply oil passage 9 is not limited to the above embodiment. For example, as shown in FIG. 8, the inlet connection oil passage 93 of the electric pump 70 may be directly connected through sealing to the first main body-side supply oil passage 91 formed in the case main body portion 20, and the outlet connection oil passage 94 of the electric pump 70 may be directly connected through sealing to the second main body-side supply oil passage 92 formed in the case main body portion 20. Alternatively, the above connection structures may be combined. The point of the present invention is that the inlet connection oil passage 93 and the outlet connection oil passage 94, which serve as connection oil passages for connecting the inlet oil passage 73 and the outlet oil passage 74 of the electric pump 70 to the first main body-side supply oil passage 91 and the second main body-side supply oil passage 92, respectively, are formed in the connection case portion 30.

(2) The above embodiment has been described with respect to an example in which the torque converter 12 is accommodated in the connection case portion 30. However, embodiments of the present invention are not limited to this. That is, it is one of preferred embodiments of the present invention to accommodate one or more members selected from a torque converter, a damper, a clutch, a flywheel, and a rotating electrical machine, in the connection case portion 30. The rotating electrical machine serves, together with the engine 11, as a driving force source of a vehicle. A motor-generator, which functions as an electric motor or an electric generator as required, is preferably used as the rotating electrical machine. The drive apparatus having such a rotating electrical machine is used for hybrid vehicles. Drive apparatuses for hybrid vehicles include one or more rotating electrical machines. Other than being accommodated in the connection case portion 30, the rotating electrical machine is preferably accommodated, together with the speed change mechanism 14, in the case main body 20. In drive apparatuses for hybrid vehicles including a rotating electrical machine, the mechanical pump 80 is driven by a driving force of one or both of the engine 11 and the rotating electrical machine which are used as a driving force source of the vehicle.

(3) In the above embodiment, the electric pump 70 is attached to, and supported by a lower left region of the peripheral wall 31 of the connection case portion 30. However, the electric pump 70 may be structured to be attached to, and supported by other region of the peripheral wall 31. The electric pump 70 may be structured to be attached to, and supported by the case main body portion 20, instead of the connection case portion 30.

The present invention is preferably used for vehicle drive apparatuses that have a hydraulically operated speed change mechanism, are connected to an engine for use, and further have an electric pump for generating an oil pressure to be supplied to the speed change mechanism.

What is claimed is:

1. A vehicle drive apparatus that includes a hydraulically operated speed change mechanism, and that is connected to an engine for use, the vehicle drive apparatus comprising:
   a case main body portion accommodating the speed change mechanism;
   an inlet side supply oil passage and an outlet side supply oil passage that are formed in the case main body portion and supply pressure oil to the speed change mechanism;
   a connection case portion connecting the engine and the case main body portion, wherein the case main body portion and the connection case portion are separate members;
   a mechanical oil pump positioned in a connection region between the case main body portion and the connection case portion, the mechanical oil pump having an inlet oil passage that is connected to the inlet side supply oil passage and an outlet oil passage that is connected to the outlet side supply oil passage;
   an electric oil pump capable of supplying pressure oil to the inlet side supply oil passage and the outlet side supply oil passage, the electric oil pump having an inlet oil passage that is connected to the inlet side supply oil passage and an outlet oil passage that is connected to the outlet side supply oil passage; and
   an inlet side connection oil passage and an outlet side connection oil passage that are provided in the connection case portion and allow the inlet oil passage and the outlet oil passage of the electric oil pump to communicate with the inlet side supply oil passage and the outlet side supply oil passage.

2. The vehicle drive apparatus according to claim 1, wherein
   the inlet oil passage of the electric oil pump is connected to the inlet side supply oil passage via the inlet oil passage of the mechanical oil pump, and the outlet oil passage of the electric oil pump is connected to the outlet side supply oil passage via the outlet oil passage of the mechanical oil pump.

3. The vehicle drive apparatus according to claim 2, wherein
   the electric oil pump is attached to the connection case portion.

4. The vehicle drive apparatus according to claim 3, wherein
   the engine, the connection case portion, and the case main body portion are axially connected together, and
   the connection case portion has a partition wall, which radially extends so as to overlap the mechanical oil pump, in a region on the case main body portion side of the connection case portion, respective connection ports of the inlet side connection oil passage and the outlet side connection oil passage are formed in an end face of the partition wall, which is located on the case main body portion side of the connection case portion and faces toward an axial direction, and the connection ports are connected through sealing to opposing connection ports, which are provided at respective ends of the inlet oil passage and the outlet oil passage of the mechanical oil pump, or to opposing connection ports provided in the inlet side supply oil passage and the outlet side supply oil passage.

5. The vehicle drive apparatus according to claim 4, wherein
   the inlet oil passage and the outlet oil passage of the mechanical oil pump are provided in a pump case that forms the mechanical oil pump.

6. The vehicle drive apparatus according to claim 2, wherein
   the engine, the connection case portion, and the case main body portion are axially connected together, and
   the connection case portion has a partition wall, which radially extends so as to overlap the mechanical oil pump, in a region on the case main body portion side of the connection case portion, respective connection ports of the inlet side connection oil passage and the outlet side connection oil passage are formed in an end face of the partition wall, which is located on the case main body portion side of the connection case portion and faces toward an axial direction, and the connection ports are connected through sealing to opposing connection ports, which are provided at respective ends of the inlet oil passage and the outlet oil passage of the mechanical oil pump, or to opposing connection ports provided in the inlet side supply oil passage and the outlet side supply oil passage.

7. The vehicle drive apparatus according to claim 6, wherein
   the inlet oil passage and the outlet oil passage of the mechanical oil pump are provided in a pump case that forms the mechanical oil pump.

8. The vehicle drive apparatus according to claim 1, wherein
   the inlet side connection oil passage is directly connected to the inlet side supply oil passage and the outlet side connection oil passage is directly connected to the outlet side supply oil passage.

9. The vehicle drive apparatus according to claim 8, wherein
   the engine, the connection case portion, and the case main body portion are axially connected together, and
   the connection case portion has a partition wall, which radially extends so as to overlap the mechanical oil pump, in a region on the case main body portion side of the connection case portion, respective connection ports of the inlet side connection oil passage and the outlet side connection oil passage are formed in an end face of the partition wall, which is located on the case main body portion side of the connection case portion and faces toward an axial direction, and the connection ports are connected through sealing to opposing connection ports, which are provided at respective ends of the inlet oil passage and the outlet oil passage of the mechanical oil pump, or to opposing connection ports provided in the inlet side supply oil passage and the outlet side supply oil passage.

10. The vehicle drive apparatus according to claim 9, wherein
    the inlet oil passage and the outlet oil passage of the mechanical oil pump are provided in a pump case that forms the mechanical oil pump.

11. The vehicle drive apparatus according to claim 1, wherein the electric oil pump is attached to the connection case portion.

12. The vehicle drive apparatus according to claim 11, wherein the engine, the connection case portion, and the case main body portion are axially connected together, and the connection case portion has a partition wall, which radially extends so as to overlap the mechanical oil pump, in a region on the case main body portion side of the connection case portion, respective connection ports of the inlet side connection oil passage and the outlet side connection oil passage are formed in an end face of the partition wall, which is located on the case main body portion side of the connection case portion and faces toward an axial direction, and the connection ports are connected through sealing to opposing connection ports, which are provided at respective ends of the inlet oil passage and the outlet oil passage of the mechanical oil pump, or to opposing connection ports provided in the inlet side supply oil passage and the outlet side supply oil passage.

13. The vehicle drive apparatus according to claim 1, wherein the engine, the connection case portion, and the case main body portion are axially connected together, and the connection case portion has a partition wall, which radially extends so as to overlap the mechanical oil pump, in a region on the case main body portion side of the connection case portion, respective connection ports of the inlet side connection oil passage and the outlet side connection oil passage are formed in an end face of the partition wall, which is located on the case main body portion side of the connection case portion and faces toward an axial direction, and the connection ports are connected through sealing to opposing connection ports, which are provided at respective ends of the inlet oil passage and the outlet oil passage of the mechanical oil pump, or to opposing connection ports provided in the inlet side supply oil passage and the outlet side supply oil passage.

14. The vehicle drive apparatus according to claim 13, wherein the inlet oil passage and the outlet oil passage of the mechanical oil pump are provided in a pump case that forms the mechanical oil pump.

15. The vehicle drive apparatus according to claim 13, wherein at least one of a torque converter, a damper, a clutch, a flywheel, and a rotating electrical machine is accommodated in the connection case portion.

16. The vehicle drive apparatus according to claim 1, wherein the inlet oil passage and the outlet oil passage of the mechanical oil pump are provided in a pump case that forms the mechanical oil pump.

17. The vehicle drive apparatus according to claim 1, wherein at least one of a torque converter, a damper, a clutch, a flywheel, and a rotating electrical machine is accommodated in the connection case portion.

* * * * *